United States Patent [19]

Müller et al.

[11] Patent Number: 5,496,127
[45] Date of Patent: Mar. 5, 1996

[54] TENSIONING DEVICE FOR FASTENING A PART, PARTICULARLY A HOLLOW SHAFT, UPON A DRIVING SHAFT

[75] Inventors: Friedrich Müller, Eisingen; Jörg Recktenwald, Karlsdorf, both of Germany

[73] Assignee: Stöber Antriebstechnik GmbH & Co., Pforzheim, Germany

[21] Appl. No.: 118,525

[22] Filed: Sep. 9, 1993

[30] Foreign Application Priority Data

Sep. 16, 1992 [DE] Germany .......... 42 30 941.7

[51] Int. Cl.[6] .................................... F16B 2/14
[52] U.S. Cl. .................. 403/371; 403/368; 403/367
[58] Field of Search .................. 403/337, 335, 403/367–371

[56] References Cited

U.S. PATENT DOCUMENTS

| | | | |
|---|---|---|---|
| 2,849,886 | 9/1958 | McCloskey | 403/371 |
| 3,590,652 | 7/1971 | Strang | 403/371 |
| 3,847,493 | 11/1974 | Peter et al. | 403/371 |
| 4,022,536 | 5/1977 | Piepho et al. | 403/371 |
| 4,425,816 | 1/1984 | Toyoda | 403/371 |
| 4,471,846 | 9/1984 | Mullenberg | 403/370 |
| 4,626,114 | 12/1986 | Phillips | 403/370 |
| 5,174,680 | 12/1992 | Nakamura et al. | 403/371 |
| 5,176,464 | 1/1993 | Tanner | 403/371 X |

*Primary Examiner*—Anthony Knight
*Attorney, Agent, or Firm*—Albert H. Reuther

[57] ABSTRACT

A tensioning device is so constructed that even thin-wall parts to be clamped can be secured and clamped reliably radially as to a driving shaft. During tensioning procedure, radial forces need not be taken up by a part to be clamped. For this purpose a force taking-up part is provided which is seated in a region of tensioning cones upon this part to be clamped or secured. For this reason very thin-wall construction can be employed and nevertheless reliable clamping radially upon the driving shaft can occur because the force taking-up part hinders and prevents that any thin-wall part is radially widened and expanded. With the tensioning device therefore it is also possible to clamp thin-wall parts, as for example thin-wall hollow shafts, with coarse-tolerance driving shafts and with driving shafts of differing basic diameter to be clamped radially in a reliable manner. Upon one of the parts to be clamped in a region of tensioning cones at least one force taking-up part is arranged which receives and takes up the radial forces encountered during tensioning procedure and being operatively connected with a tensioning element.

14 Claims, 3 Drawing Sheets

5,496,127

TENSIONING DEVICE FOR FASTENING A PART, PARTICULARLY A HOLLOW SHAFT, UPON A DRIVING SHAFT

BACKGROUND OF THE INVENTION

1. Field of the Invention

The present invention pertains to a tensioning device for fastening of a part, particularly a hollow shaft, upon a driving shaft, including two tensioning cones, which lie against each other with tensioning-cone surfaces, being arranged at least partially in a region between the part to be tensioned and the driving shaft and being shiftable relative to each other via at least one ring-shaped, annular tensioning element, which is connected axially rigidly with one tensioning cone.

2. Description of the Prior Art

With a known tensioning device in the prior art a hub is chucked or clamped radially upon a driving shaft. The tensioning element is a tensioning nut, which has two oppositely extending inner threads, with which it engages in corresponding outer threads of the tensioning cone. The tensioning cones are shifted relative to each other by turning or rotation of the tensioning nut and thereby the hub is clamped radially upon the driving shaft. The forces effective radially arising during the tensioning procedure are taken up by tile hub itself. The hub for this reason must be constructed comparatively thick in order to avoid an impermissible or inadmissible radial expansion and widening of the hub. Thin-wall parts cannot be clamped radially upon a driving shaft with such a tensioning device, because the radial tensioning forces would expand and widen the thin-wall part radially in an inadmissible manner.

SUMMARY OF THE INVENTION

An object of the present invention is to construct a generic tensioning device so that also thin-wall parts to be clamped and tensioned can be clamped reliably radially with the driving shaft. This object is resolved with the generic tensioning device so that upon one of the parts to be clamped in a region of the tensioning cone at least one force-taking-up part is arranged therewith which takes up the radial forces arising and encountered during tensioning procedure and being operatively connected with the tensioning element.

The radial forces arising and encountered during the tensioning procedure must not be taken up by one part to be clamped and secured. For this there is provided the force-taking-up part which is seated upon this part to be tensioned and secured in a region of the tension cone. It can therefore be constructed in a very thin-wall manner and nevertheless still being clamped reliably radially upon the driving shaft. With the present inventive tensioning device it is with that also possible to clamp and secure thin-wall parts, as for example thin-wall hollow shafts, with coarse-tolerance driving shafts and clamped as well as being secured reliably radially with driving shafts differing in basic diameter. The force-taking-up part precludes and prevents that any thin-wall part is expanded and widened radially.

Further objects and advantages of the present invention are apparent from the following description and disclosure, reference being made to the drawings setting forth features of the present invention in greater detail.

DETAILED DESCRIPTION

Figure 1:
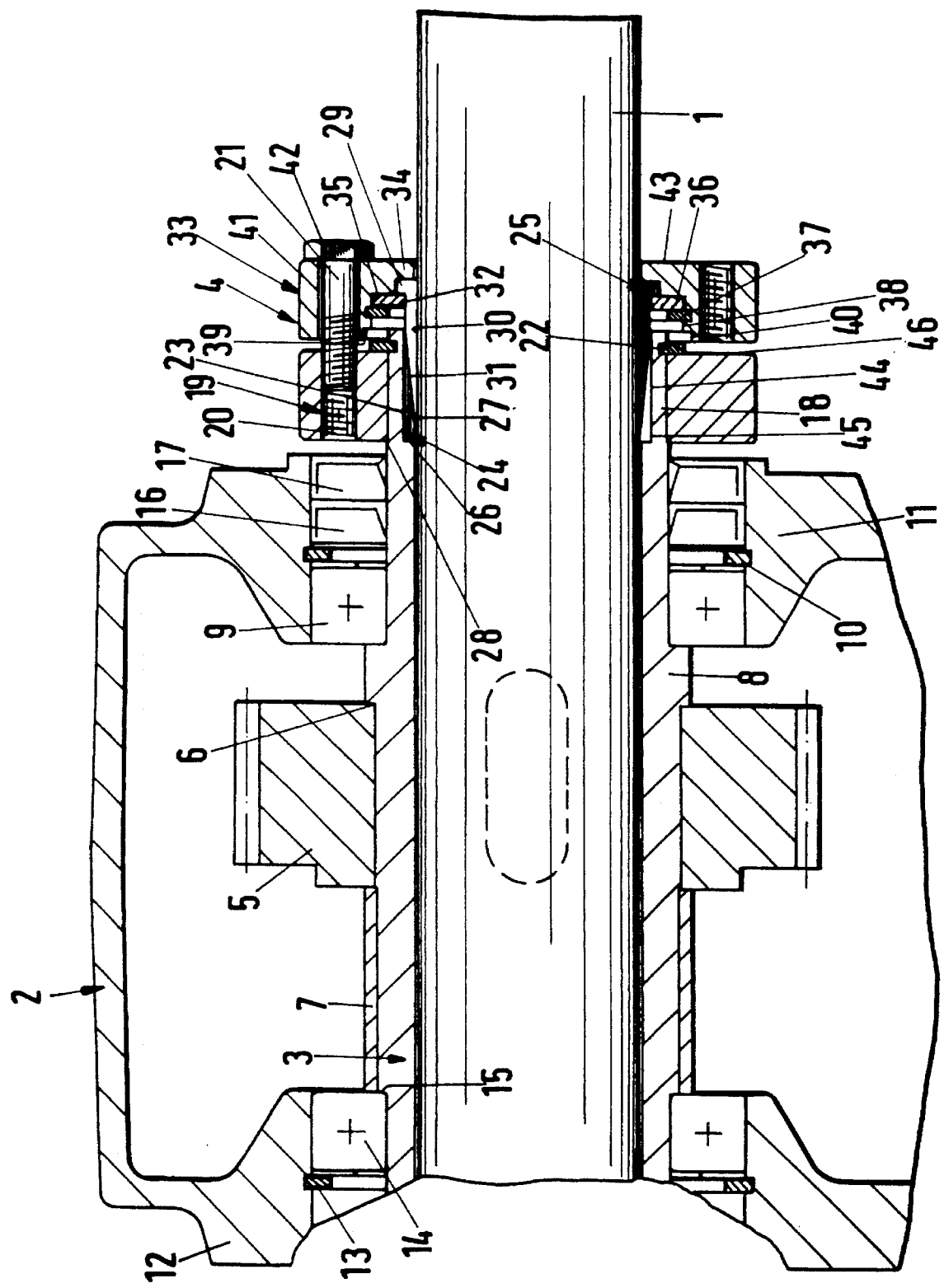
FIG. 1 of the drawings in an axial section shows the present inventive tensioning device, with which a thin-wall hollow shaft is clamped and secured upon a driving shaft respectively machine shaft.

Referring now to FIG. 1 of the drawings, a driving shaft passes as guided through a housing 2 which is only partially illustrated in the drawing. A thin-wall hollow shaft 3 is clamped and secured with a tensioning device 4 upon the driving shaft 1. The hollow shaft 8 is clamped upon the driving shaft 1 at both ends with respectively a tensioning device 4. In FIG. 1 there is illustrated only one tensioning device. The other non-illustrated tensioning device is constructed identically, yet being arranged in a mirror-symmetrical manner. The hollow shaft 3 carries and supports inside the housing 2 for example a gear or toothed wheel 5. It engages against a shoulder 6 of the hollow shaft 3 and is secured axially in the other axial direction via a spacer or distance-sleeve or bushing 7. The shoulder 6 is an end or face side of a collar or band 8, which is constructed advantageously integrally and unitary with the hollow shaft 3. The collar or band 8 serves simultaneously as an axial securing safety device for a bearing 9, with which the hollow shaft 3 is rotatably journalled in the housing 2. The bearing is secured axially additionally by a securing ring 10, which is installed and accommodated in an inner wall of a hub part 11 of the housing 2. The housing 2 has a further hub part 12, in which likewise a securing ring 13 is journalled, which serves for axial securing of a further bearing 14, with which the hollow shaft 3 likewise is rotatably journalled in the housing 2. In the other axial direction this bearing 14 is secured by a spacer or distance sleeve or bushing 7 as well as by a shoulder 15 in the outer mantle surface of the hollow shaft 3. The two bearings 9, 14, which advantageously are roller bearings, are installed and accommodated in the hub parts 11 and 12 of the housing 2.

Upon the side of the securing ring 10 remote and away from the bearing 9 there are two sealing rings 16 and 17 arranged in the hub part 11, which sealing rings seal-off the housing 2 relative to the hollow shaft 3. In the other hub part 12 of the housing 2 there are provided likewise such sealing rings which however are not illustrated in FIG. 1 of the drawings.

The hollow shaft 3 at both ends projects axially beyond the housing 2. Since in FIG. 1 only one hollow shaft end is illustrated, in the following description also only the tensioning device 4 provided at this end is described in detail. Upon the shaft end 18 projecting axially over and beyond the housing 2 there is seated a counter-holding ring 19, which over its periphery and scope provides threaded bores 20 for tensioning screws 21 arranged evenly and uniformly distributed therewith which lie parallel to the axis of the drive shaft 1.

Figure 2:
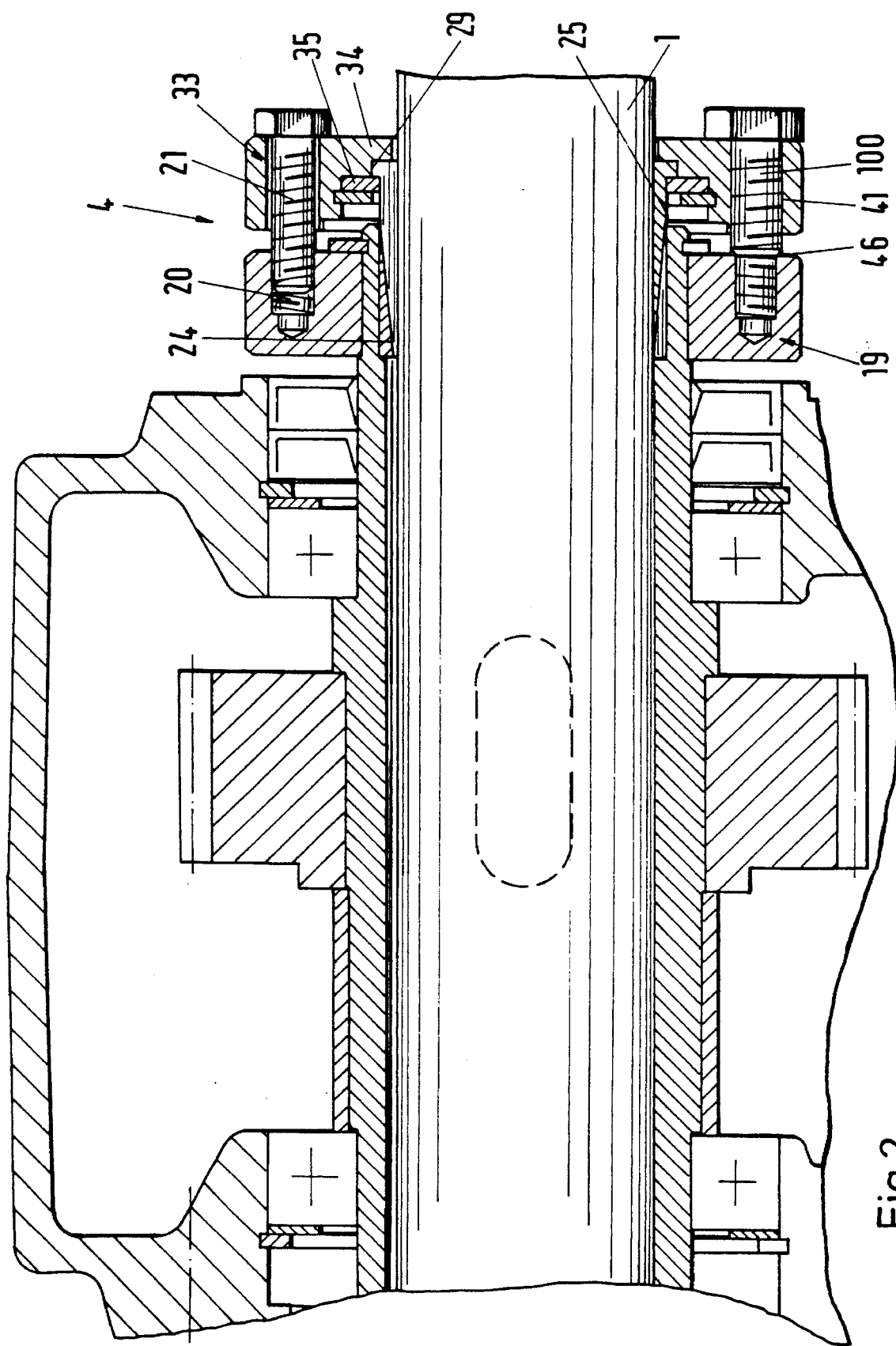
FIG. 2 shows the tensioning device of FIG. 1, with which press-off screws are utilized for release of the clamping.

The threaded bores 20 are advantageously through-bores, which pass axially through the counter-holding ring 19. The threaded bores 20 however also can be constructed as blind-hole or dead-end bores (FIG. 2). The counter-holding ring 19 engages with its side remote and away from the housing 2 against a securing ring 22 which is fastened close to the free end upon the shaft end 18. The tensioning position illustrated in FIG. 1 has the counter-holding ring 19 spaced from the hub part 11 of the housing 2.

In the region of the counter-holding ring 19, the shaft end 18 is provided internally with a ring-shaped recess or depression 23, which extends as far as to a free end of the hollow shaft 3. The depression 23 serves as a receiving space or chamber for two tensioning cones 24 and 25, which are components of the tensioning device 4. The one tensioning cone 24 is supported and engages against a radial bottom 26 of the depression 23. The tensioning-cone surface 27 of the tensioning cone 24 opens from the bottom 26 of the depression 23 extending in a direction toward the free end of the hollow shaft 3. As shown in FIG. 1, this tensioning cone 24 has approximately and substantially the same identical axial length as the counter-holding ring 19. The radially extending bottom 26 of the depression 23 lies in a level or height of the shoulder 28 against which the counter-holding ring 19 engages.

The other tensioning cone 25 projects axially from the depression 23 and is provided at its end located externally of the shaft end 18 having provided therewith a radially outwardly directed flange 29. The tensioning cone 25 with its cylindrical inner surface 30 lies and engages upon the driving shaft 1. With a spacing from the flange 29, the tensioning cone 25 upon its outer side has a tensioning-cone surface 31, with which it engages in the tensioning position against the tensioning-cone surface 27 of the other tensioning cone 24. In a region between the tensioning-cone surface 31 and the flange 29, the tensioning cone 25 on an outer side thereof has a cylinder surface 32.

Upon a side of the counter-holding ring 19 remote and away from the housing 2 there is located a tensioning ring 33, which is connected with the counter-holding ring 19 via the tensioning screws 21. The tensioning ring 33 at an end thereof remote and away from the counter-holding ring 19 has a radially inwardly directed flange 34, with which tensioning ring 33 encroaches or grips over the radially outwardly directed flange 29 of the tensioning cones 25. The inner diameter of the flange 34 of the tensioning ring 33 is nominally larger that the outer diameter of the driving shaft 1, so that the tensioning ring 33 with the still to be described tensioning procedure can be shifted easily in a direction toward the counter-holding ring 19. Internally the tensioning ring 33 is provided with a securing ring 35 with which the flange 29 of the tensioning cone 25 is secured axially upon a side away and remote from the flange 34. The securing ring 35 engages against a radially extending shoulder surface 36 of the tensioning ring 33. In this position, the securing ring 35 is secured axially by a further securing ring 37, which is arranged in an annular groove in a cylindrical surface 38 of the tensioning ring 33 adjoining the radial shoulder surface 36. The diameter of the cylindrical surface 38 is larger than the outer diameter of the shaft end 18 of the hollow shaft 3. The cylindrical surface 38 has a transition via a radially outwardly extending shoulder surface 39 into a further cylinder surface 40, which extends as far as to the end or face side of the tensioning ring 33 toward a counter-holding ring 19. The diameter of the cylindrical surface 40 is larger and greater than the outer diameter of the securing ring 22, with which the counter-holding ring 19 is secured axially upon the shaft end 18. Thereby the tensioning ring 33 can be shifted axially sufficiently far in a direction toward the counter-holding ring 19, since the tensioning ring 33 with its cylindrical surface 40 can be shifted over the securing ring 22.

The tensioning ring 33 over its peripheral circumference provides through-passage openings 41 for the tensioning screws 21 arranged uniformly and evenly distributed over the periphery or circumferential scope thereof. Advantageously the through-passage openings 41 are threaded bores, which have a larger and greater diameter than the screw shafts of the tensioning screws 21.

The two tensioning cones 24, 25 are constructed slotted over the axial length thereof so that they can be installed and employed for driving shafts 1 differing in diameter. With the tensioning devices it is possible to connect the hollow shaft 3 with the prescribed inner diameter with driving shafts 1 which have greater tolerances. Respectively, according to the tolerance of the driving shaft 1, the tensioning cones 24, 25 in a tensioning condition are expanded and widened radially to a differing extent.

For radial tensioning and clamping of the thin-wall hollow shaft 3 upon the driving shaft 1, the tensioning screws 21 are inserted through the through-passage openings 41 of the tensioning ring 33 and are screwed into the threaded bores 20 of the counter-holding ring 19. The tensioning screws 21 are supported and engage with a head 42 thereof against an end or face side 43 of the tensioning ring 33 remote and away from the counter-holding ring 19. By tightening of the tensioning screws 21, the tensioning ring 33 is shifted in a direction toward the counter-holding ring 19. Whereby the tensioning cone 25 is taken axially along therewith via the radially inwardly directed flange 34 of the tensioning ring 33, whereby the two tensioning cones 24 and 25 via the tensioning cone surfaces 27 and 32 thereof cooperating with each other exert a radially effective tensioning force upon the hollow shaft 3. Thereby the hollow shaft 3 is tensioned and clamped radially upon the driving shaft 1. The tensioning cone 24 is supported and engages whereby with its cylindrical outer mantle surface 44 against the cylindrical side wall 45 of the depression 23 of the hollow shaft 3. The counter-holding ring 19 is constructed so thick that it can take up the radially effective tensioning forces. Thereby the thin-wall hollow shaft 3, which in a region of the depression 23 is reduced still further in wall thickness, is optimally supported via the counter-holding ring 19, so that a secure and safe radial clamping and tensioning of the hollow shaft 3 upon the driving shaft 1 is attained. Since the counter-holding ring 19 in an axial direction has approximately and substantially equal length as does the tensioning cone 24, the radial force arising and encountered during the tensioning procedure is taken up over the entire length of the tensioning cone. The tensioning cone 24 itself is supported and engages against the bottom 26 of the depression 23 during the tensioning procedure, so that during shifting of the other tensioning cone 25 there is assured and guaranteed a satisfactory tensioning and clamping therewith. During tightening of the tensioning screws 21, the counter-holding ring 19 is reliably supported and engaged via the securing ring 22 against axial shifting, so that only the tensioning ring 33 is shifted axially in a direction upon and toward the counter-holding ring 19. The cone angle of the two tensioning cones 24, 25 lie in the self-impeding, obstructive and hindering range.

If the hollow shaft 3 is installed sequentially upon driving shafts 1 differing due to coarser tolerances in diameter, the tensioning cones 24, 25 then can be installed and employed as a consequence of the radial expanding or widening capability thereof for these coarsely toleranced driving shafts. With different basic diameters of the driving shaft 1, correspondingly thicker tensioning cones 25 can be installed and employed. Since the two tensioning cones 24, 25 are supported and engaged in axial direction, a satisfactorily tensioning of the hollow shaft 3 upon the driving shaft 1 can be attained.

Since the through-passage openings 41 of the tensioning ring 33 have a greater and larger diameter than the screw shaft, the tensioning screws 21 during the tensioning procedure are not effective together with the through-passage openings 41. The through-passage openings 41 constructed advantageously as threaded bores however are then relied upon when the tensioning device 4 is to be loosened or released (FIG. 2). In this case, the tensioning screws 21 are first and initially screwed out. The radial tensioning is maintained and kept hereby initially because the cone angle of the tensioning cones 24, 25 lies in the self-hindering or binding range. Now the press-off screws 100 in the screw-passage openings 41 are screwed so far that they come into engagement against the end or face side 46 of the counter-holding ring 19. Advantageously the tensioning ring 33 is turned and rotated nominally with respect to the counter-holding ring 19, so that the press-off screws 100 do not come into the range of the threaded bores 20 of the counter-holding ring 19. Since the radially inwardly directed flange 34 of the tensioning ring 33 has nominal or small spacing from the driving shaft 1, the tensioning ring 33 can be easily turned and rotated. During further screwing-in of the press-off screws, the tensioning ring 33 is pressed away from the counter-holding ring 19. Hereby via the securing ring 35 and the radially outwardly directed flange 29, the tensioning cone 25 is pushed or shifted axially back whereby the tensioning effect is canceled and released. Since the tensioning ring 33 has been rotated relative to the counter-holding ring 19 before the pressing-off procedure, the press-off screws come into engagement against the counter-holding ring 19 in a region between the threaded bores 20. The threaded bores 20 of the counter-holding ring 19 are thereby preserved and protected so that the entry region of these threaded bores 20 is not damaged during the pressing-off procedure. In the described manner the tensioning device 4 can be disassembled without any effort and without any strain in an easy, effortless manner. In FIG. 2 in the upper half there is still shown the tensioning screw 21 in the tensioning position, while in the lower half there is shown the press-off screw 100 employed for loosening or release of the tensioning device 4.

Figure 3:
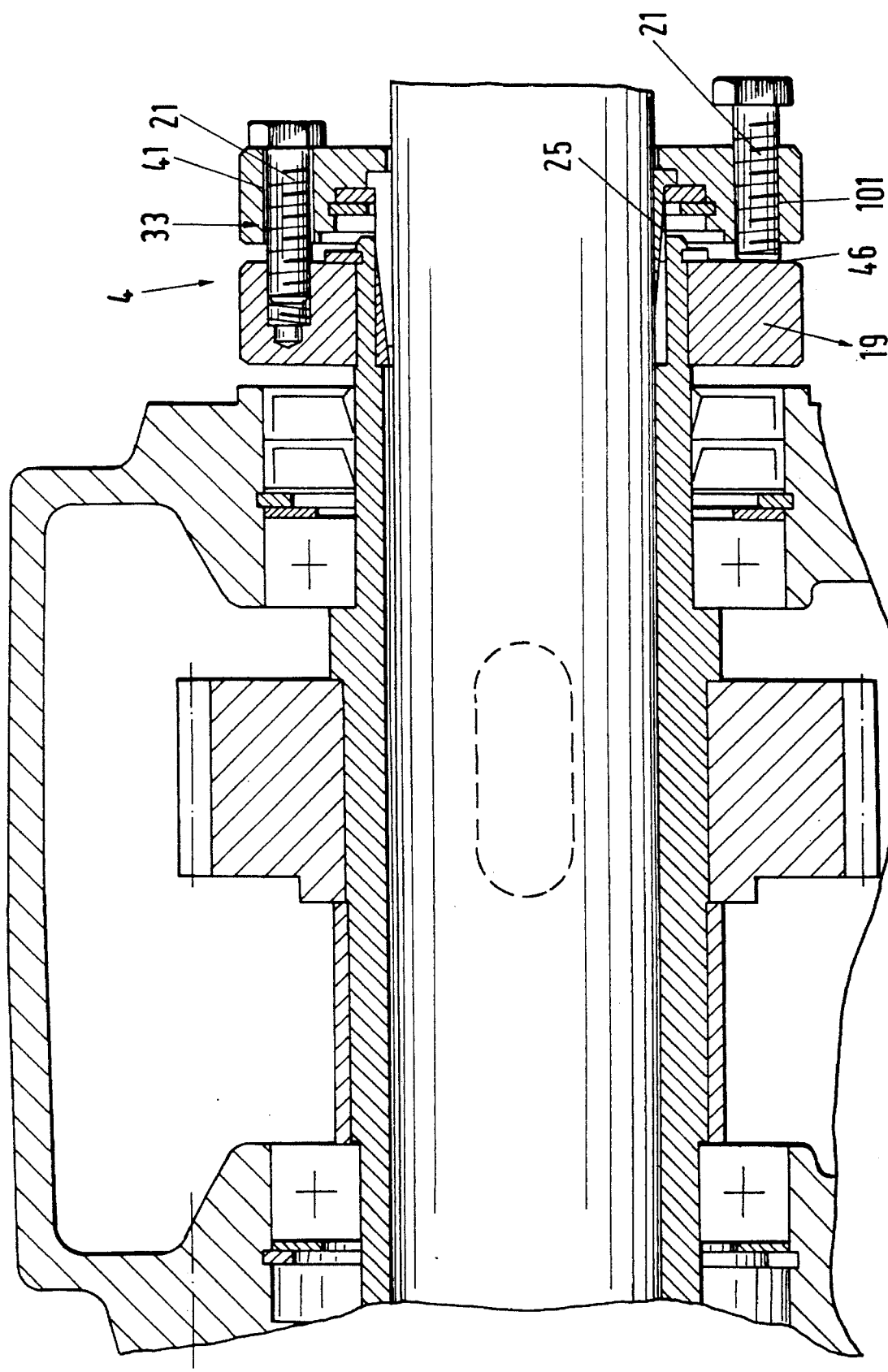
FIG. 3 shows the tensioning device of FIG. 1, with which for releasing of the clamping there are employed tensioning screws with which also the clamping is undertaken.

With the embodiment according to FIG. 3 in addition to the through-passage openings 41 there are provided at least two threaded bores 101 in the tensioning ring 33 which are adapted, coordinated and harmonized as to the tensioning screws 21 and passing axially through the tensioning ring 33. Then the tensioning screws 21 can be relied upon and utilized for pressing-off of the tensioning ring 33.

The tensioning screws 21 are screwed into the threaded bores 101 of the tensioning ring 33, until they come into engagement (lower half of FIG. 3) against the face side 46 of the counter-holding ring 19. The screw head of the tensioning screws 21 then still has spacing from the tensioning ring 33. During further screwing-in of the tensioning screws 21, then the tensioning ring 33 and the tensioning cone 25 are removed away from the counter-holding ring 19. In this manner, the tensioning device 4 is likewise easily loosened or released.

In FIG. 3 furthermore in the upper half there is shown the tensioning screw 21 in the tensioning position thereof, while in the lower half of the tensioning screw 21 is shown in a position, in which the tensioning screw 21 with its free end just comes into engagement against the face side 46 of the counter-holding ring 19.

Since with this embodiment the tensioning screws 21 are not employed to produce or generate any tensioning forced but rather are employed for loosening or release of the tensioning device 4, which tensioning screws 21 are screwed into the threaded bores 101, the through-passage openings 41 require no threads, in contrast to the embodiment according to FIGS. 1 and 2. The threaded bores 101 in the tensioning ring 33 are provided so that a threaded bore 20 in the counter-holding ring 19 does not lie in a location opposite thereto. Thereby there is assured that the tensioning screws 21 during the loosening or release procedure can engage with support against the face side 46 of the counter-holding ring 19.

One tensioning cone 24 can also be rigidly connected with the hollow shaft 3, for example being welded thereto, adhered or pin-connected therewith. Also the tensioning cone 24 can be constructed unitary and integrally with the hollow shaft 3.

In summary, the present invention provides that at least one force-receiving or taking-Up part 19 is arranged upon one of the parts 1, 3, particularly 3 to be tensioned and clamped, which force-receiving or taking-apart 19 takes up the radial forces arising and encountered during the tensioning procedure and being effectively connected with the tensioning element 33.

The force receiving or taking-up part 19 is connected with the tensioning element 33 by tensioning screws 21, which are screwable into the force-receiving or take-up part 19.

The tensioning screws 21 pass free of play through the tensioning element 33 and engage with a head 42 thereof against a side 43 of the tensioning element 33 away and remote from the force-receiving or taking-up part 19.

The tensioning screws 21 are located and lie parallel to the axis of the driving shaft 1.

The force-receiving or taking-up part 19 is a ring which is axially secured and seated upon a part 3 to be clamped and tensioned in place.

The tensioning element 33 is a ring which is arranged with axial spacing from the force-receiving-take-up part 19.

One tensioning cone 25 has at least one flange 29 serving as a take-along means, with which a tensioning cone is connected axially rigid and fixed with the tensioning element 33.

The flange or take-along means 29 is structurally a radially outwardly flange of the tensioning cone 25.

The tensioning element 33 provides threaded bores 41 for the passage of the tensioning screws 21 therethrough.

The threaded through-passage bores 41 have a larger and greater diameter than that of the screw shafts of the tensioning screws 21.

One tensioning cone 24 is received and accommodated in an internal depression 23 of one part 3 to be tensioned and clamped.

The other tensioning cone 25 projects into the depression 23.

The inner diameter of one part 3 to be tensioned and clamped is larger and greater than that of the basic diameter of the driving shaft 1.

The tensioning element 33 is rotatable with respect to the force-take-up or receiving part 19.

The tensioning cone 24, 25 is expandable and widenable radially elastically.

One tensioning cone 24 is rigidly connected with a part 3 to be clamped and tensioned, preferably being constructed unitary and integrally therewith.

The present invention is, of course, in no way restricted to the specific disclosure of the specification and drawings, but also encompasses any modifications within the scope of the appended claims.

What we claim is:

1. A tensioning device for fastening of a part which is a hollow shaft, upon a driving shaft, including two tensioning cones, which engage against each other with tensioning-cone surfaces, being arranged at least partially in a region between the hollow shaft to be tensioned and the driving shaft and being shiftable relative to each other via at least one ring-shaped tensioning element, which is rigidly connected axially with a tensioning cone, comprising:

at least one force receiving and taking-up part arranged upon at least one part to be secured and clamped in a region of the tensioning cones, said force-receiving taking-up part taking up radial forces encountered during tensioning procedure, the force taking-up part being connected with the ring-shaped tensioning element by tensioning screws, which are screwable into the force taking-up part, said force taking-up part being a ring which is axially secured as seated upon one part to be clamped and secured, one tensioning cone engaging against the hollow shaft to be fastened, the tensioning cone engaging the driving shaft being provided with said ring-shaped tensioning element which is connected with the force taking-up part by the tensioning screws, said force taking-up part surrounding the other tensioning cone, one said tensioning cone being a part separate from said ring-shaped tensioning element and having a take-along means with which said one tensioning cone is connected axially fixed with said ring-shaped tensioning element, said force taking-up part being seated directly upon said hollow shaft, said hollow shaft being arranged in a region of said force taking-up part between the tensioning cone engaging against the hollow shaft and the force taking-up part.

2. A tensioning device according to claim 1, in which said tensioning screws pass with play through the tensioning element and a head is provided by each of the tensioning screws, said head engaging against the side of a tensioning element remote and away from the force taking-up part.

3. A tensioning device according to claim 1, in which said tensioning screws are located parallel to an axis of the driving shaft.

4. A tensioning device according to claim 1, in which the tensioning element is a ring which is arranged with axial spacing from the force taking-up part.

5. A tensioning device according to claim 1, in which one tensioning cone provides at least one take-along means with which the tensioning cone is connected axially rigidly fixed with the tensioning element.

6. A tensioning device according to claim 5, in which said take-along means is a radially outwardly directed flange of the tensioning cone.

7. A tensioning device according to claim 1, in which said tensioning element provides threaded bores for through-passage of the tensioning screws 21.

8. A tensioning device according to claim 7, in which said threaded bores have a greater diameter than that of the tensioning screws.

9. A tensioning device according to claim 1, in which one tensioning cone is installed and accommodated in an internal depression of one of the parts to be clamped.

10. A tensioning device according to claim 9, in which the other tensioning cone projects into the depression.

11. A tensioning device according to claim 1, in which an inner diameter of one of the parts to be clamped is greater than the basic diameter of the driving shaft.

12. A tensioning device according to claim 1, in which the tensioning element is rotatable relative to the force taking-up part.

13. A tensioning device according to claim 1, in which the tensioning cones are elastically radially expandable and capable of being widened.

14. A tensioning device according to claim 1, in which one tensioning cone is rigidly connected with one part to be clamped.

* * * * *